G. ESTERLY.
Harvester.
No. 3,956. Reissued May 3, 1870.
Fig. 2,
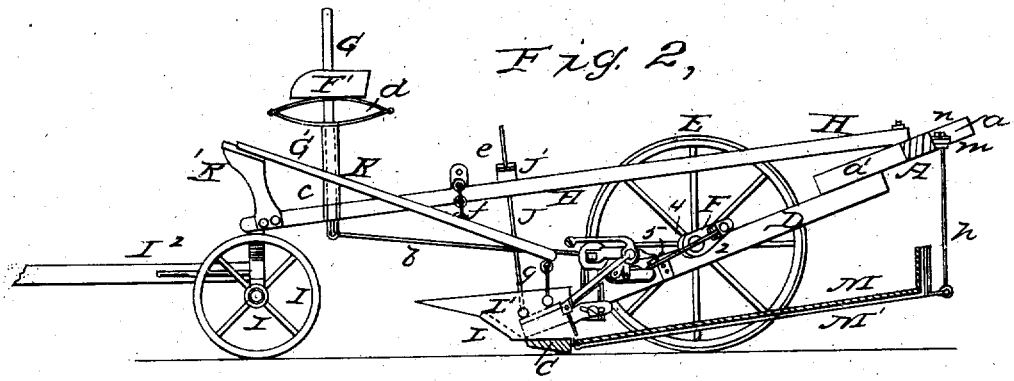
Fig. 1,
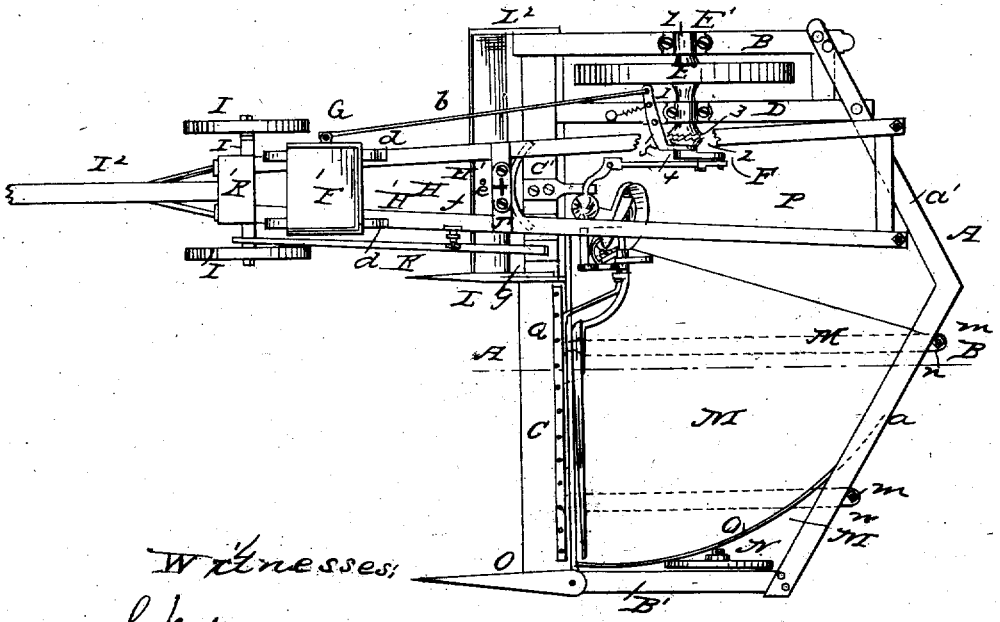
Witnesses:
S. B. Mears,
Milton Keene.
Inventor:
J. H. Leiberling
N. PETERS, Photo-Lithographer, Washington, D. C.

UNITED STATES PATENT OFFICE.

JOHN F. SEIBERLING, OF AKRON, OHIO, ASSIGNEE OF GEORGE ESTERLY.

IMPROVEMENT IN HARVESTERS.

Specification forming part of Letters Patent No. 23,666, dated April 19, 1859; Reissue No. 3,956, dated May 3, 1870.

DIVISION B.

*To all whom it may concern:*

Be it known that GEORGE ESTERLY, of Whitewater, in the county of Walworth and State of Wisconsin, has heretofore invented a new and Improved Combined Automatic Rake and Harvester; and I do hereby declare that the following is a full, clear, and exact description of that part of the invention which forms the subject-matter of this division of reissue, reference being had to the annexed drawings, making a part of this specification, in which—

Figure 1 represents a top or plan view of said ESTERLY'S combined automatic rake and harvester, a part of the frame being shown broken away. Fig. 2 represents a section on line A B, Fig. 1.

To enable those skilled in the art to make and use the said ESTERLY'S combined automatic rake and harvester, I will proceed to describe the same more in detail.

The nature of that part of said ESTERLY'S invention which forms the subject-matter of this division of reissue consists, first, in a peculiarly-constructed main frame, as hereinafter explained; second, in the combination, with the main frame for supporting the cutting apparatus, of a hinged draft-frame, as hereinafter explained; third, in the combination and relative arrangement with the main frame A, constructed as described, of the hinged draft-frame H, driver's seat F′, foot-lever K, and links *f* and *g*, substantially as hereinafter described.

In the drawings, A represents the frame of the machine, which is constructed of two parallel bars or pieces, B B′, connected at their front ends by the finger-beam C and the traverse-piece C′, the end of the finger-beam being fastened to the under side of the inner end of the traverse-piece, while the back ends of the parallel pieces B B′ are connected together by oblique bars *a a′*. A supplemental bar or piece, D, is attached to the frame parallel to the piece B, and quite near to it.

The form of the main frame A, which is composed of the pieces above named, is clearly shown and indicated in Fig. 2.

Between the parallel pieces B D is arranged the main supporting and driving wheel E, the axle E′ thereof being supported and turning in suitable bearings 1 1 upon the parallel pieces B D.

On the inner end of the axle E′ is fitted loosely a crank, F, the hub 2 of which is provided with ratchet-teeth to fit the ratchet-teeth on the hub-piece 3, which is fastened to the axle E′.

The hub 2 of the crank F is provided with a groove to receive the forks 4 of the clutch-lever 5, which is pivoted at 6 to the parallel piece D, whereby crank F can be connected with the axle when desired, so as to turn with it by simply drawing forward the outer end of clutch-lever 5, which throws hub 2 into clutch with hub 3. This operation can be performed by the driver from his seat F′ by means of the hand-lever G, the lower end of which is hinged to the front end of a rod, *b*, which extends back and is hinged to the outer end of the clutch-lever 5, as fully indicated in the drawings.

The lever G is hinged at *c* to one of the standards G′ which supports the seat-springs *d*, and extends up by the side of the driver's seat in a convenient position to be operated by him.

The standards G′ are supported upon a taper draft-frame, H, composed of the longitudinal pieces H′ H′, and front and rear cross-pieces, as indicated in the drawings, the front cross-piece of said taper-frame H being connected by a king-bolt to the axle I of the wheels $I^1$ $I^1$, from which projects the draft pole or tongue $I^2$.

The rear end of the taper frame H is connected by hinged joints to the back oblique bar *u′* of the main frame A.

To the upper side of the front traverse-piece C′ is attached, by hinged joints, a bifurcated upright bar, J, its upper end being provided with holes, and extending up through a slot or mortise in the cross-piece J′, attached to the upper sides of the longitudinal pieces of the frame H, whereby the front of frame A, together with the finger-beam and the cutting apparatus supported thereon, can be sustained at any desired elevation from the ground by simply inserting pin *c* in one of the holes in bar J above the cross-piece J′.

It will thus be seen that the machine can be adjusted very readily and quickly for cutting high or low.

To the under side of frame H a foot-lever, K, is attached by a link, *f*, the rear end of said lever being connected by a link, *g*, to the traverse-piece C′, while its front end extends forward to near one end of the foot-board K′, whereby the driver, by simply placing his foot on the front end of lever K and depressing the same, can temporarily raise the front part of the frame A with the finger-beam and cutting apparatus supported thereon, to pass obstructions in the path of the machine.

An inclined fender-board, L, is attached to the lower edges of the inner divider-board $L^1$, and the outer fender-supporting board $L^2$, whereby the front part of the machine, in rear of the wheels $I^1$ $I^1$, will surmount and pass over the stubble, hillocks, and similar elevations without undue friction, and without materially increasing the draft of the machine.

The grain-platform M is of quadrantal shape, and has attached to its under side two supporting-bars, M′ M′, the front ends of which bars are provided with loops or eyes, which slide onto right-angled hooks projecting from the rear of the finger-beam. By this arrangement the platform can be readily attached and detached from the finger-beam by simply moving it laterally either toward or from the outer end of the finger-beam, as the case may be.

The rear ends of the platform-supporting bars M′ M′ are held up by hinged rods *h*, the upper ends of said rods passing through holes in ear-pieces *m m* attached to the oblique frame-piece *a*.

The platform-sustaining rods *h* are fitted with screw-threads and nuts *n* upon their upper ends, whereby the rear end of the platform may be adjusted up or down, as may be desired, by simply screwing up or unscrewing the nuts *n*.

The outer circular edge of the platform is provided with a curved vertical ledge or fender, *o*.

Between the outer edge of the platform and the bar or piece B′ is arranged a grain-wheel, N, the journal of which is fastened to the piece B′ so as to stand nearly in the same vertical plane with the journal or axle of the main supporting-wheel E.

The grain-wheel N is arranged to run inside of the outer line cut by the sickle, and consequently there is no danger or liability of its running upon and dragging down stalks of standing grain outside of the line of cut. This will fully appear by reference to Fig. 1, from which it will be seen that the outer divider O gathers the stalks of grain to be cut upon a line entirely outside of the grain-wheel.

By attaching the draft-frame H by hinged joints to the rear of the main frame, which is elevated above the axle E′, the tendency of the draft is to hold the finger-beam to the ground, while by placing the driver's seat upon the draft-frame H his weight tends to elevate the finger-beam, and thus counterbalance the action of the draft on the main frame, thus enabling the manufacturer to construct his machine so that it will be very evenly balanced when in use.

By making the rear of the main frame of oblique bars *a a′* a very strong frame is produced, and one, too, that is braced in such a manner that the strain consequent upon the draft of the machine is thrown directly upon the parallel pieces B, B′, and D.

By making the platform in the form shown, and the main frame with its rear part elevated, a free and open space, P, is obtained under the rear part of the draft-frame, through which the gavel can be conveniently discharged from the platform and deposited upon the ground by the automatic rake Q without liability of being caught by the main supporting-wheel or the mechanism by which the rake is operated.

The arrangement of the axle of the main supporting-wheel, the grain-wheel, finger-beam, and platform is such that the frame can be nearly balanced, so as to rock on the journals of said wheels, to enable the finger-beam to conform to the inequalities of the ground, while at the same time the fender *o* can be arranged upon the platform so as to conform to the segment of the circle described by the outer end of the rake as it sweeps the grain from the platform M.

By simply detaching the connecting-rod between the crank on the axle of the main wheel and the automatic rake Q the rake can be lifted and removed from the machine, the spindle or arbor G′, which supports the rake, being fitted so that it can be raised from its tubular bearing H.

It will be seen that both the grain-platform and the automatic rake can be conveniently detached and removed from the machine to adapt the machine for mowing, and as readily replaced again to enable the machine to be used for cutting grain.

What is claimed as the invention of GEORGE ESTERLY, and desired to have secured by this division of reissue Letters Patent, is—

1. The peculiarly-constructed main frame A, composed of the pieces B B′, C C′ D, and *a a′*, substantially as described.

2. The combination, with the main frame A, constructed as described, of the hinged draft-frame H, substantially as described.

3. The combination and relative arrangement, with the main frame A, constructed as described, of the hinged draft-frame H, driver's seat F′, foot-lever K, and links *f* and *g*, substantially as described.

JOHN F. SEIBERLING.

Witnesses:

MILTON MOORE,
S. B. WEARY.